Nov. 3, 1925.

F. E. STEVENSON ET AL 1,560,117

MOLDING PRESS

Filed Sept. 23, 1924   7 Sheets-Sheet 1

Inventors
F. E. Stevenson
T. F. Stacy
by their Attorneys

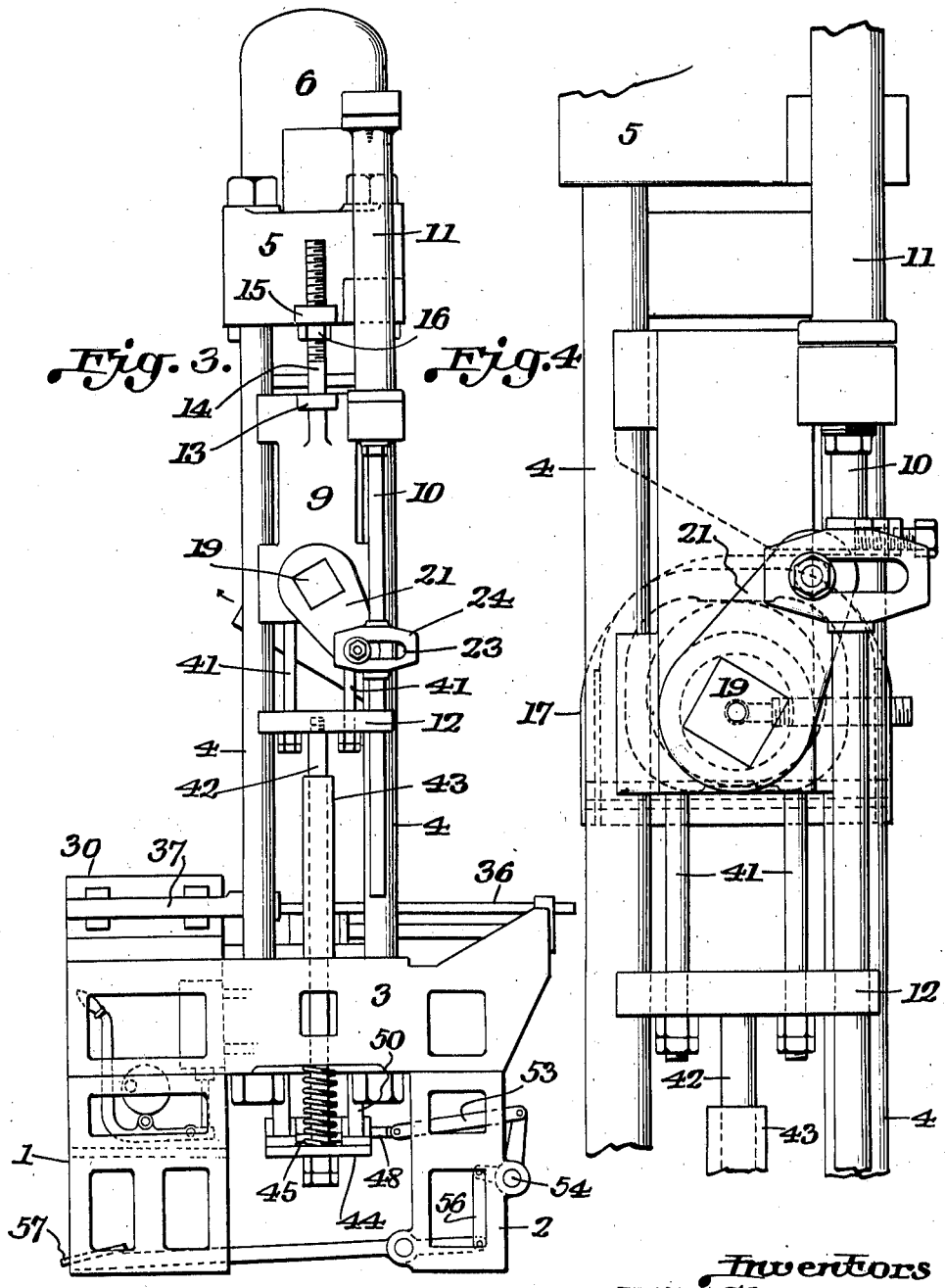

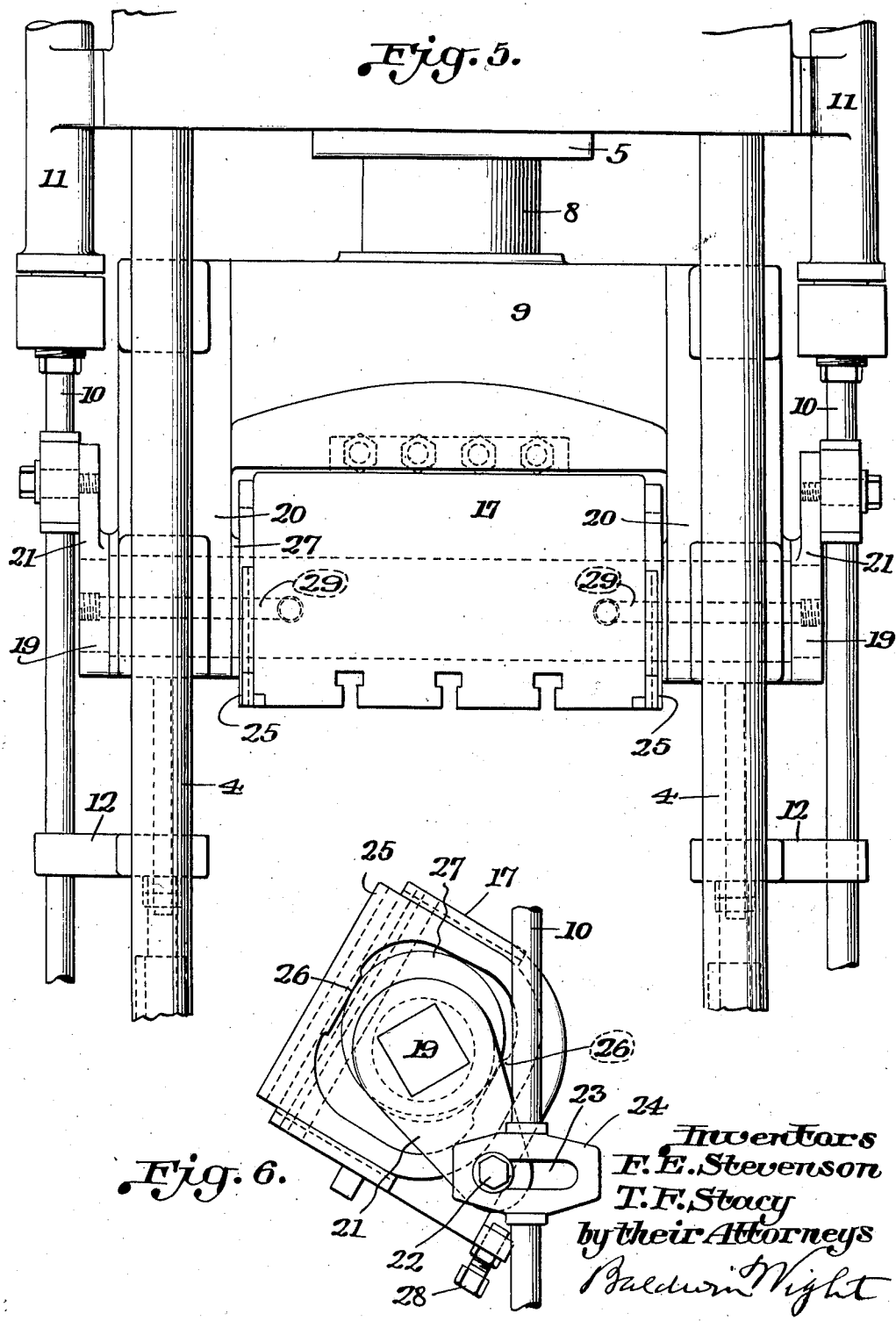

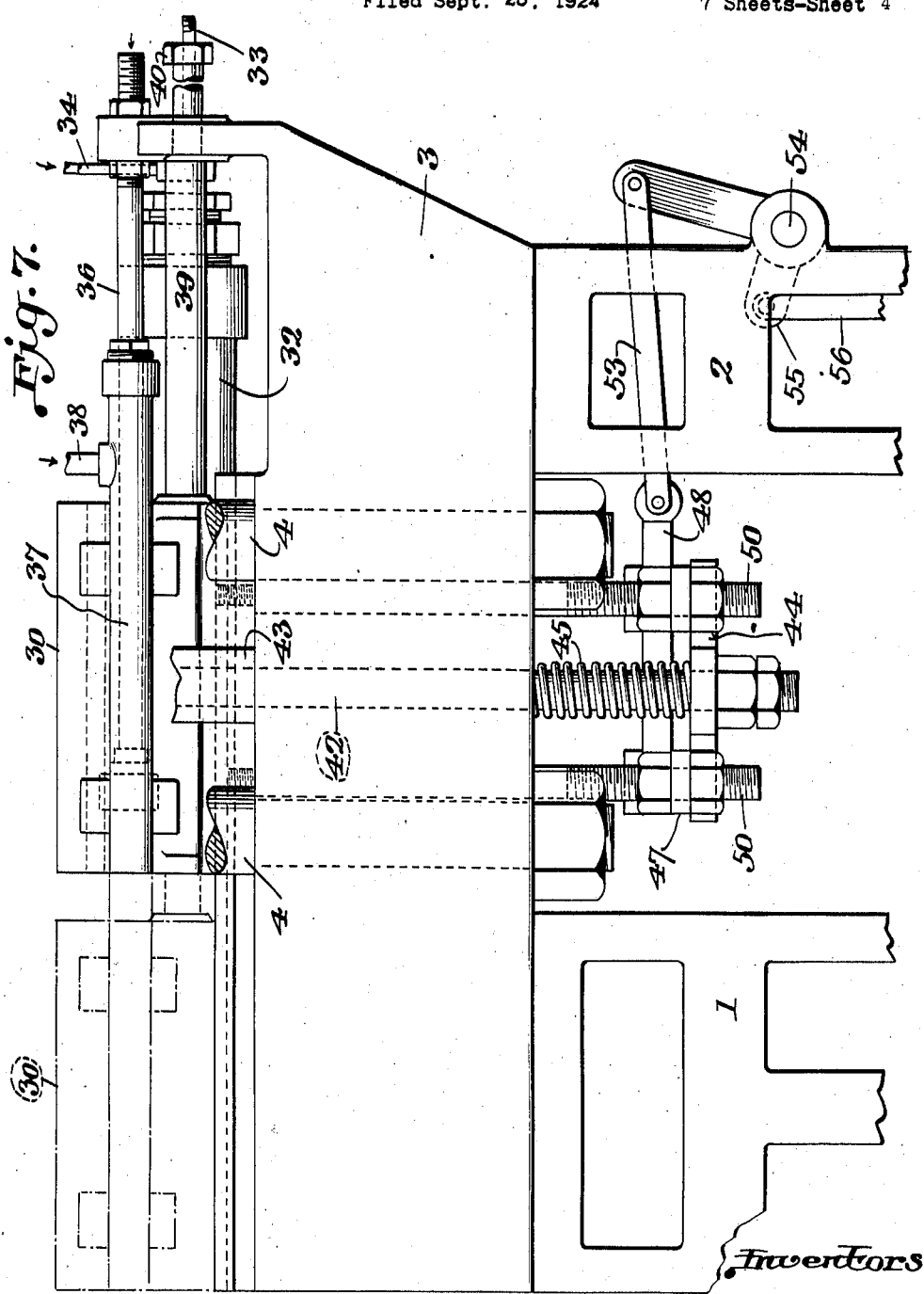

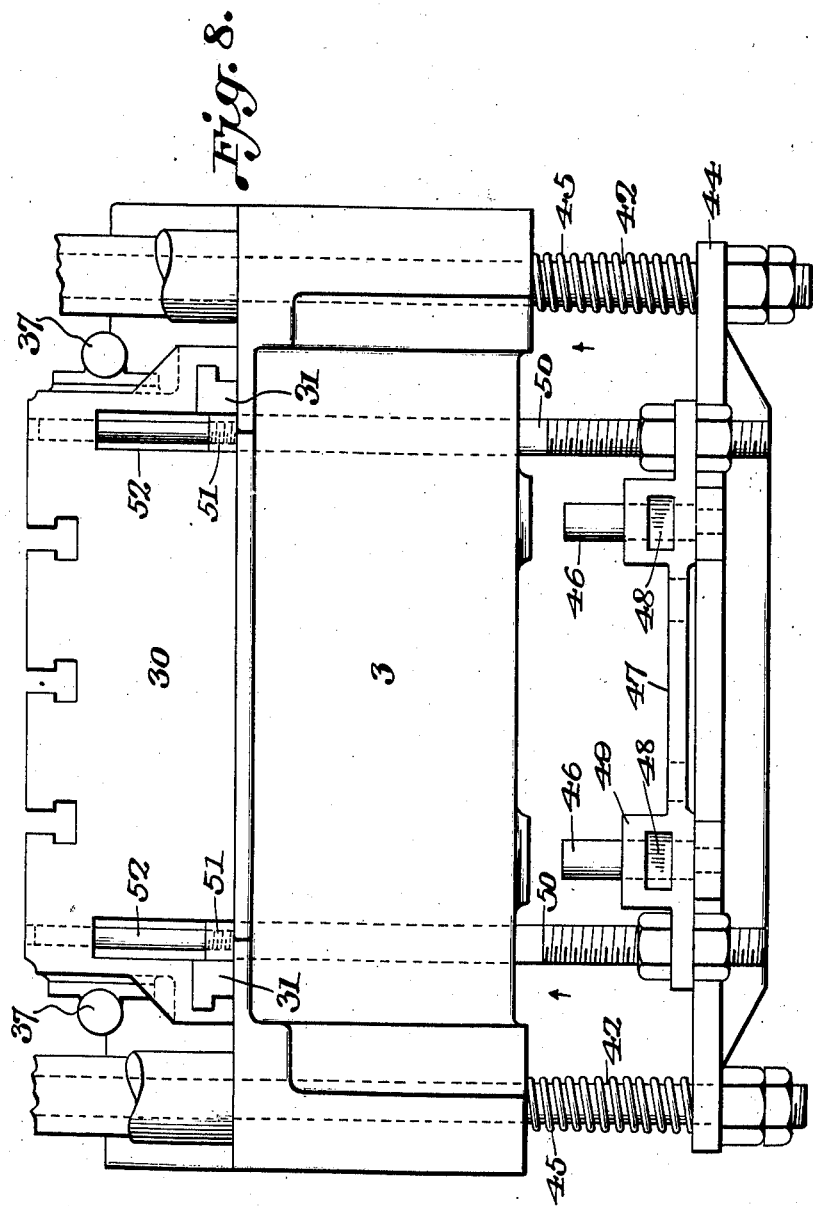

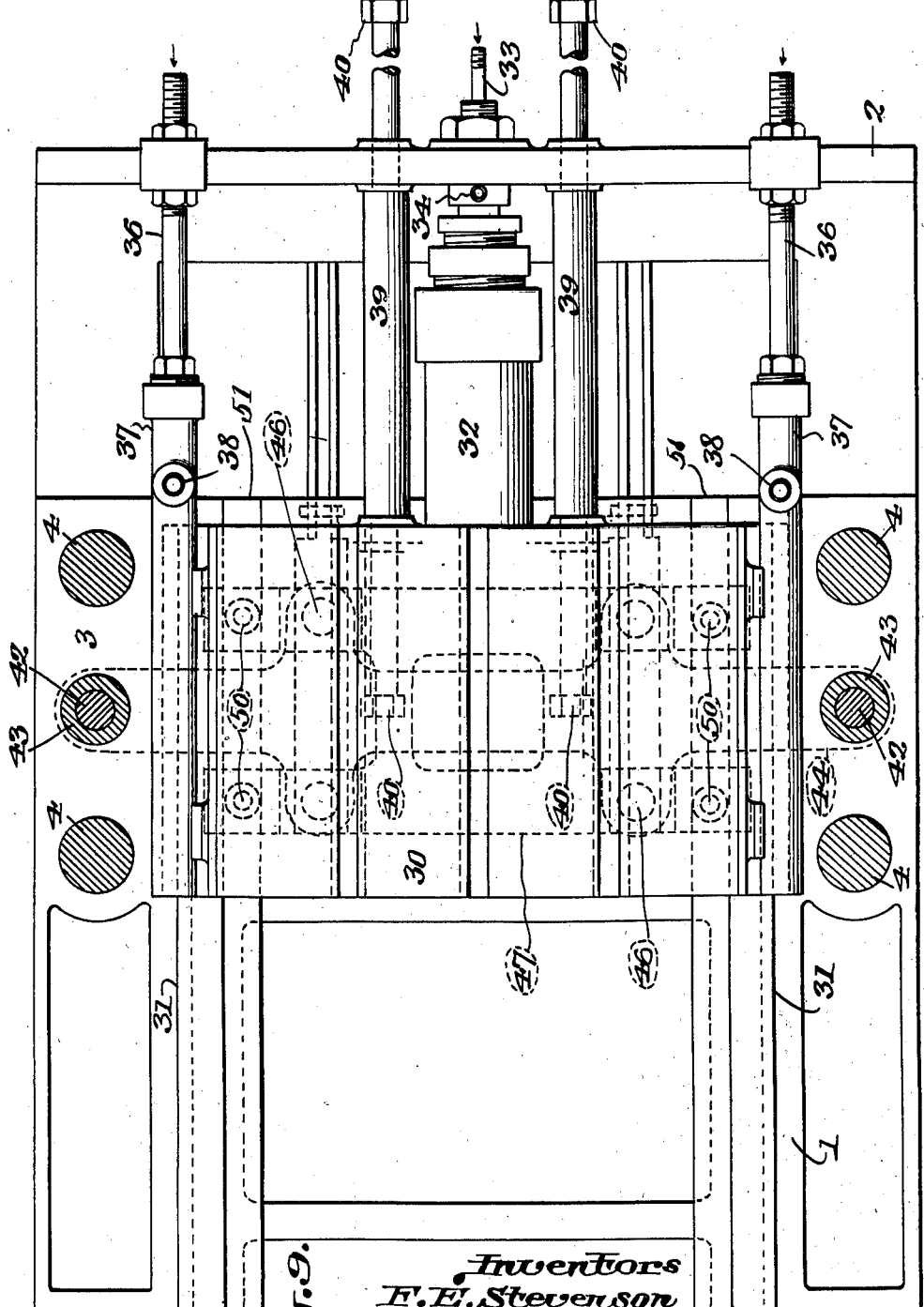

Nov. 3, 1925.  
F. E. STEVENSON ET AL  
MOLDING PRESS  
Filed Sept. 23, 1924  
1,560,117  
7 Sheets-Sheet 7

Inventors  
F. E. Stevenson  
T. F. Stacy  
by their Attorneys

Patented Nov. 3, 1925.

1,560,117

UNITED STATES PATENT OFFICE.

FRANCIS E. STEVENSON AND THOMAS F. STACY, OF MOUNT GILEAD, OHIO, ASSIGNORS TO THE HYDRAULIC PRESS MANUFACTURING COMPANY, OF MOUNT GILEAD, OHIO.

MOLDING PRESS.

Application filed September 23, 1924. Serial No. 739,303.

*To all whom it may concern:*

Be it known that we, FRANCIS E. STEVENSON and THOMAS F. STACY, citizens of the United States, and residents of Mount Gilead, in the county of Morrow and State of Ohio, have invented certain new and useful Improvements in Molding Presses, of which the following is a specification.

This invention relates particularly to a press for molding of phenolic condensation products, pyrolic condensation compounds, or for similar materials which require substantially the same treatment. It is intended to be equipped with steam and water pipes and to perform work where hot molding alone is necessary, or where the mold is afterwards chilled. It may also be used for cold molding.

There is provided an inverted main cylinder which moves a platen and operates at 3000 pounds per square inch pressure. A tilting head is carried by the main platen and is adapted to swing through 120° from operating position to afford easy access thereto. The tilting head is provided with T-slots for attaching the molds, and adjustable stops are employed to limit the upward movement of the platen at any desired point. Pipe connections for the supply of steam or cold water to the molds pass through the trunnions by which the tilting head is supported from the platen, and therefore these connections are in operative relation at all times. The movements of the platen, the tilting head, and the supply of steam and cold water are all controlled through automatic valve mechanism.

The bed portion of the press extends to the front and is built with a track on which the lower table slides, said table being provided with T-slots for the lower molds. These are also heated or chilled as desired by steam or water supplied through telescoping connections.

Special means are provided for controlling the tilting movements of the tilting head. A kick-out arrangement for the lower bed is controlled by the upward movement of the upper platen, and a foot pedal is provided for releasing the kick-out rods which are returned by spring actuated means. The tilting head is also provided with automatic ejector mechanism, two forms of which are disclosed in the application.

Various other detail features form a part of the invention, which is described in the following description and covered by the appended claims.

In the drawings:

Figure 3 is a side elevation with the parts in the positions corresponding to Figure 1.

Figure 4 is a side elevation of a part of the press, showing the tilting head moved back to operative position.

Figure 5 is a front elevation of the upper platen with the tilting head in operative position, corresponding to Figure 4.

Figure 6 is a side elevation of the tilting head in tilted position showing one form of ejector mechanism.

Figure 7 is a side elevation of the lower sliding table moved outward to inoperative position.

Figure 8 is a front elevation of the lower table showing a portion of the ejector mechanism.

Figure 9 is a section taken through the press just above the lower table, showing the latter in plan.

Figure 1:
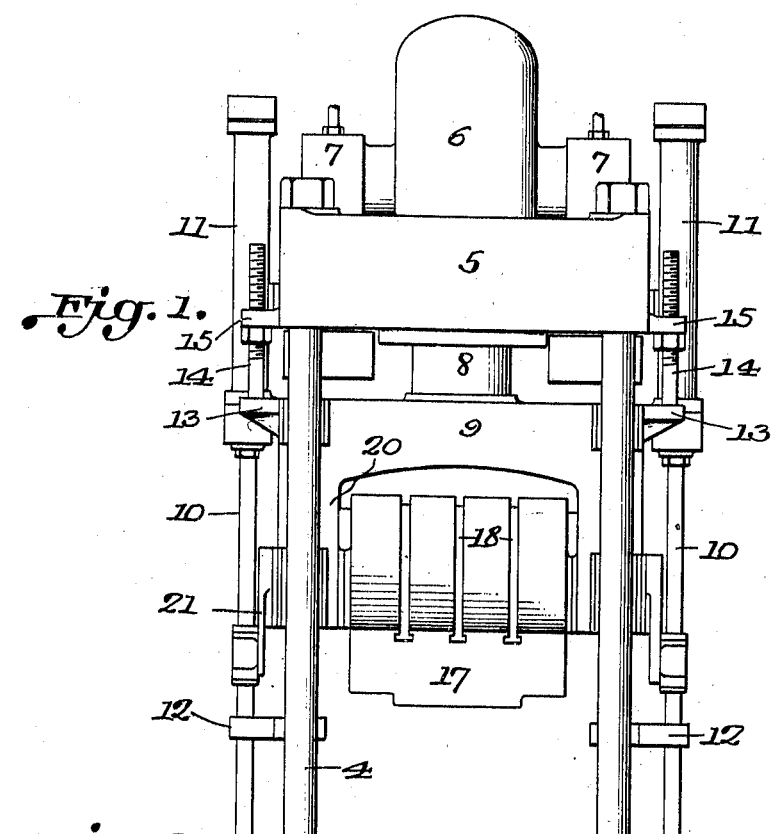
Figure 1 is a front elevation of the press with the upper platen at the upper limit of its movement and the tilting head in tilted position.
Figure 2:
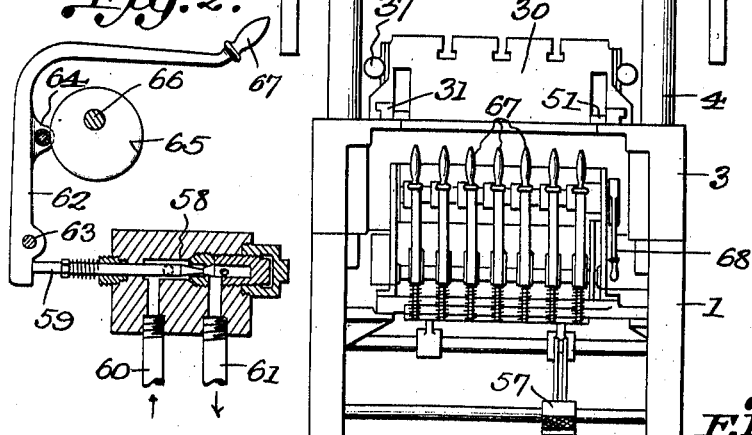
Figure 2 is a sectional somewhat diagrammatic view of one of the valves which control the various steps of the operation.

As illustrated the press comprises front supports 1 and rear supports 2 which support the main frame 3 connected by four strain rods 4 with the upper portion 5 which carries the main cylinder 6 and auxiliary cylinders 7 cast integral therewith. A main ram 8 carrying a platen 9 works in the main cylinder, while auxiliary rams 10 work in auxiliary cylinders 11, have extended ends passing through guides 12 and are connected to the mechanism for tilting the head, hereinafter described. These guides form cross heads sliding on the strain rods and have further functions hereinafter described.

The platen 9 has lugs 13 cast thereon which serve to limit the upward movement of the platen by contact with stop rods 14 which are screwed into lugs 15 cast on the main cylinder 6. The rods are held in adjusted position by nuts 16.

Carried by the platen 9 is a tilting head 17 provided with T-shaped grooves 18 which receive the molds. This head is provided with trunnions 19 which are pivotally mounted in depending side portions 20 of the platen 9 so that the head can be rotated from a position as shown in Figures 4 and 5 in which the face thereof is in a horizontal plane and the molds are in pressing position, to the position shown in Figures 1, 3 and 6 in which it has been rotated through approximately 120°. This operation is accomplished in the following manner.

Carried by the outer end of each trunnion 19 is a crank arm 21, the outer end of which has a bolt or pin 22 working in a slot 23 in a short cross head 24 carried by the ram 10. Obviously as the rods or rams 10 are moved by pressure in the auxiliary cylinders 11, the crank arms 21 will cause the tilting head to turn on the trunnions 19. This movement is or may be entirely independent of the vertical movement of the main platen and preferably takes place before and after the movements thereof.

Since probably a large number of the molding pieces will stick in the molds of the tilting head it is advisable to provide some automatic means for ejecting the same. In the form of Figures 1 to 6 inclusive, this is carried out in the following manner. A frame or yoke 25 is mounted to slide in guides at each side of the tilting head 17 and is machined at two points on the inside thereof as shown at 26 to fit eccentrics 27 rigidly carried by the platen 9. As the tilting head rotates about the stationary eccentrics these will cause a sliding movement of the frames 25 at the sides of the tilting head into the position shown in Figure 6. Cross bars may be provided to connect these frames and these may carry the mold pins so that they will move outwardly and eject the pieces. A reverse rotation of the tilting head will obviously withdraw the frames 25 to a position in which they do not project beyond the face of the tilting head.

Adjustable stops 28 may limit the tilting movement in each direction. For the purpose of supplying steam or water or both to the tilting head, passages 29 are provided which pass through the trunnions and may be connected to flexible pipes as desired.

The lower press bed 3 supports a sliding table 30 which is guided on tracks 31. Attached thereto is a hydraulic cylinder 32 of the usual type of double acting hydraulic cylinders, the piston rod 33 of which has two passages 34 and 35 therethrough, one permitting the flow to one side of the piston head and the other to the opposite side. This is a construction familiar to those skilled in the art and in itself forms no part of the invention, so that it has not been illustrated in detail. Obviously admission of water to one or the other side of the piston head will move the table in the desired direction. In Figure 7 the sliding table is shown in operative position in full lines and in its outer position in dotted lines. Steam is supplied to any chambered molds which may be attached to the sliding table by means of pipes 36 rigidly held to the base extension and small cylinders 37 carried by the sides of the table which telescope on the pipes 36 as the table moves back and forth. These cylinders 37 have pipes 38 connected thereto. Rods 39 pass through and are fixed to the base and are provided at their ends with adjustable nuts 40 by which the movement of the sliding table in each direction may be limited.

There is also provided automatic ejector mechanism for the lower mold on the sliding table 30 which will now be described. Rods 41 extending downward from the platen 9 support the cross head or guide 12 and to this is connected a rod 42 which passes through a sleeve 43 which limits the movement of the cross head 12 in one direction. This construction is duplicated at each side of the press and the rods 42 are attached at their lower ends to a yoke 44. Springs 45 interposed between the yoke and the press bed tend to move the cross head 12, rods 42 and yoke 44 downwardly. Rigidly carried by the yoke 44 are pins 46 which operate to raise a second yoke 47 through the interposition of sliding bars 48 which slide in guides 49 in said yoke 47. These bars have holes large enough to permit the passage of the pins 46 when said holes are in line therewith. The yoke 47 is provided with upwardly extending rods 50 which are fast at their upper ends to bars 51 which are operated in slots 52 under the sliding table. The sliding bars 48 are connected by links 53 to a rock shaft 54 which has a crank arm 55 connected by a link 56 to a foot lever or pedal 57 normally held in raised position by a spring (not shown). When the pedal is up, the bars 48 are in such position that the pins 46 do not register with the holes, and therefore when the upper platen is raised, carrying with it the rods 42, the yoke 44 and pins 46 will rise, and the pins will lift the bars 48 and consequently the yoke 47, which in turn lifts the rods 50 and the bars 51. Any molds which may be attached to the table 30 are provided with pins (not shown) which rest on the bars 51. Consequently the above described upward movement of the parts will raise these pins and eject the pieces from the mold so that the operator can lift them off. This can be done with the sliding table in either of its positions. When the operator desires to return the parts, the foot pedal 57 is depressed which slides the bars 48 towards the rear of the machine, bringing the holes therein into line with the pins 46. Then the yoke 47 and connected parts drop by gravity, the yoke 47 dropping onto the yoke 42 once more. This is the position of the parts shown in Figure 8. The pedal spring then causes only a slight shearing action on the pins 46 and consequently the pedal does not rise.

However, when the upper press head again moves downward, the rods 42 will descend with the yoke 44 and the pins 46. Since the rods 50 are fast to the bars 51 and these cannot move downward any farther than shown in Figure 8, the pins 46 are withdrawn from the bars 48 and after they disengage the same, the pedal spring again operates to raise the pedal and slide the bars 48 endwise until the holes therein no longer register with the pins 46. The parts are again in position for automatic ejection of the pieces upon the next upward movement of the upper press head or platen.

The various steps of the operation are timed by means of a series of valves which may be operated either manually or automatically. One of these valves is shown diagrammatically in Figure 2, and comprises a valve 58 having a sliding stem 59 spring urged in one direction and controlling inlet and outlet pipes 60 and 61. Each valve is operated by means of a horizontal lever 62 pivoted at 63 on a rod and having a projection 64 operated by a cam 65 on a shaft 66 that may be driven as desired. Each cam segment is removable and when setting up a new set of molds, the valves are operated by handles 67 on the levers until the proper timing is determined, when a set of cam segments will be constructed adapted for that particular work and these will be considered a part of the mold equipment. The whole automatic feature may be thrown out of operation by a lever 68 at the right of the set of valves. The exact arrangement of these valves and of the connections to the various hydraulic cylinders of the fluid pipes has not been illustrated since similar arrangements are old and this in itself forms no part of the invention. The operation may be entirely manual, entirely automatic, or partly manual and partly automatic, as the character of the work may render desirable.

Figure 10:
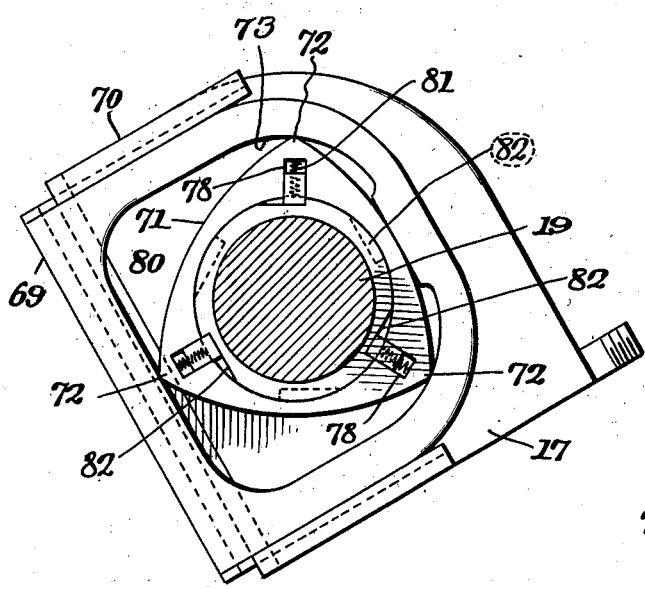
Figure 10 is a side elevation of a modified form of ejector mechanism for the upper tilting head, shown in partially tilted position.
Figure 11:
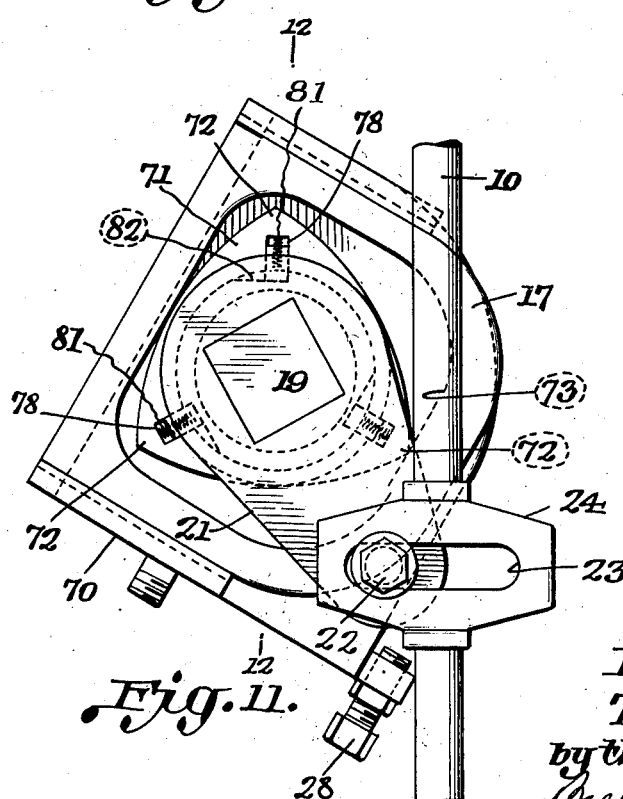
Figure 11 is a similar view showing the head in completely tilted position.
Figure 12:
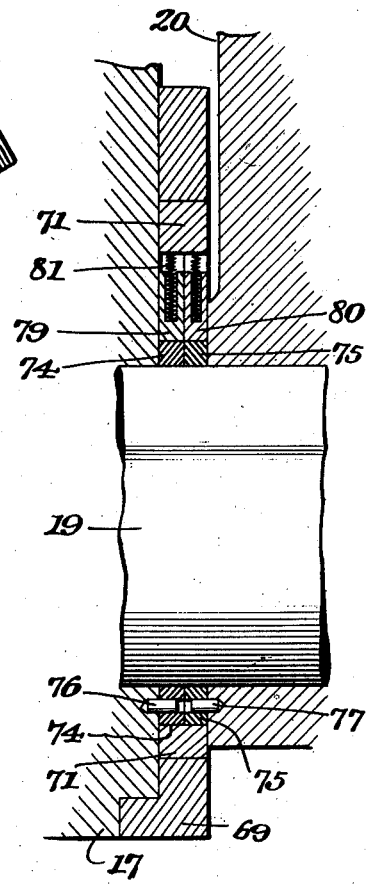
Figure 12 is a section on the line 12—12 of Figure 11.

Figures 10, 11 and 12 disclose a modified form for the ejection of the pieces from the upper mold. The mechanism for moving the tilting head to the different positions is the same as that previously described and ilustrated in the other modification of the invention. However, in that form of the device, the frames or yokes 25 are in their most extended position when the tilting head has moved through an angle of 120° from its operative position. In the modified construction, these yokes reach their most extended position when the head has been tilted through an angle of about 60°, and as the tilting movement continues, they are retracted until they are flush with the pressing surface of the tilting head when it has reached the end of its tilting movement. Moreover, on the return movement, these yokes remain stationary with respect to the tilting head. This operation is brought about by the following construction:

The frames or yokes 69 are guided in grooves 70 similar to the first form, and each yoke fits over a cam plate 71 of approximately triangular shape and having three engaging points 72. When the head is in fully tilted position or in normal operative position, one of the points 72 is in engagement with a flat portion 73 on the yoke and holds it in its retracted position. When the head begins to tilt from normal pressing position, the cam plates 71 are held in fixed position so that the yokes 69 are compelled to slide outwardly until the head has turned through about 60°, after which the yokes are retracted again through the next 60° of rotation of the head. On the return movement from fully tilted to pressing position, the cam plates 71 turn with the head, and consequently no motion is imparted to the yokes 69.

Each of the cam plates is associated with two ratchet plates 74 and 75, of which the plate 74 is fastened to the tilting head 17 by pins 76, while the plate 75 is fastened to the arm 20 of the main platen by pins 77. The ratchet plate 74 therefore always revolves with the tilting head 17, while the ratchet plate 75 never revolves. The trunnion 19 passes through both ratchet plates but is connected to neither. As clearly shown at Figures 10 and 11, the cam plates are slotted at each corner as at 78. In the slots are placed two pawls 79 and 80 which are normally pressed outwardly by the springs 81 and cooperate with notches 82 in the cam plates 74 and 75 respectively. When the head starts to revolve from pressing position, the cam plates 71 are held stationary by means of the pawls 80 which engage in notches in the edge of the stationary ratchet plate 75. However, the ratchet plate 74 which is fast to the head 17 revolves and causes the pawls 79 to yield against the force of the springs 81. After the head has revolved through 120° the pawls 79 again engage notches in the edge of the plate 74. But when the head revolves in the opposite direction toward pressing position, the plate 74 revolves therewith and the pawls 79 carry the cams 71 and cause them to revolve with the head 17. During this motion the pawls 80 recede against the force of their springs 81. Since the cam plates revolve with the head at this time, there is no tendency to force the yokes 69 outward, in fact, they are restrained against such movement.

It is thought that the operation of the device will be clear from the above description, but it may be briefly recapitulated. Assuming that a pressing operation has just been completed, pressure is admitted into the auxiliary cylinders 7 to move the upper platen and ram upward. Subsequently, pressure is admitted into the auxiliary cylinders 11 to give the rods 10 a downward movement and thereby rotate the tilting head from the position of Figure 4 to that of Figures 1 and 6, the ejecting mechanism operating as already described. This upward movement of the main platen will at the same time through the rods 41, cross head 12 and rod 42 raise the lower yoke 44 and through the mechanism already described, eject the pieces from the lower mold, whether the table is in its normal or outer position. This table is moved outwardly either simultaneously with the rise of the upper platen or subsequent thereto. The ejecting mechanism having operated, the pedal 57 is operated, permitting the mechanism to move to a point where it will again be set upon reverse movement of the upper platen. Before pressure is admitted into the main cylinder to move the upper platen downwardly, the auxiliary cylinders 11 must raise the rods 10 to rotate the tilting head to pressing position. All of these operations may be automatic and timed by the rotation of the cam shaft 66, or they may be manually controlled by the levers 62. They may also be partly automatic and partly manual. Such valve mechanism controlled by cams on a rotating shaft is old and common and has not been illustrated nor described in detail. The various inlet and outlet pipes for steam and water have also not been shown in full, since these features in themselves constitute no part of the invention.

It is obvious that many details of the structure herein illustrated and described may be varied without in any way departing from the spirit of the invention, which is to be regarded as limited only by the scope of the appended claims.

We claim as our invention:

1. A molding press comprising an upper press member including a platen, means for reciprocating said platen to and from pressing position, means for limiting the movement of the platen to a straight line, a mold carrying head carried by said platen, and means for tilting said head independent of the movement of the platen.

2. A molding press comprising a press member movable only in a straight line to and from pressing position, a head pivotally carried thereby, and means for oscillating said head on said press member to bring the operative face thereof to readily accessible position.

3. A molding press comprising a platen having a direct line movement only, a mold supporting member pivotally carried by said platen, and means for oscillating said member independent of the straight line movement of the platen.

4. A molding press comprising a mold supporting member, hydraulic means for giving said member movement to and from pressing position, and hydraulic means automatically operable for oscillating said member to bring the operative face thereof to readily accessible position.

5. A molding press comprising a press member movable only in a straight line to and from operative position, a head pivotally carried thereby, means for imparting pivotal movement to said head, and an automatic ejecting device carried by said head.

6. A molding press comprising a press member movable to and from operative position, a head pivotally carried thereby, means for imparting pivotal movement to the head, and an automatic ejecting device operated by said pivotal movement of the head.

7. A molding press comprising a press member movable to and from operative position, a head pivotally carried thereby, means for imparting pivotal movement to the head, an ejecting device, and cam means operated by the pivotal movement of the head for actuating said ejecting device.

8. In a molding press having a press member comprising a tilting head, means for tilting said head, an ejecting device, means for projecting the ejecting device during a portion of the tilting movement and returning it to inactive position during the remainder of the tilting movement.

9. In a molding press having a press member comprising a head and means for moving said head through an arc from normal to tilted position, an ejecting device, means for projecting said device while the head moves through a portion of the arc from normal to tilted position and returning it to inactive position during the remainder of the tilting movement, and means whereby the ejecting device does not operate during the movement of the head from tilted to normal position.

10. A molding press comprising upper and lower press members, means for moving the upper member towards and from the lower, an ejecting device for the lower member operated by the movement of the upper away therefrom, and means whereby the movement of the upper member towards the lower returns the ejecting device to normal position.

11. A molding press comprising upper and lower press members, means for moving the upper member towards the lower, means for sliding the lower member into and out of pressing position, and an ejecting device for the lower member operated by the movement of the upper away therefrom regardless of whether the lower member is in its inner or outer position.

12. A molding press comprising two press members, means for moving said press members in directions at an angle to each other to and from their pressing positions, and an ejecting device for one member operated by the movement of the other away from pressing position regardless of the relative position of the first member.

13. A molding press comprising two press members, means for moving said press members in directions at an angle to each other to and from their pressing positions, an ejecting device for one member operated by the movement of the other member from pressing position regardless of the relative position of the first member, and means for releasing said ejecting device at will.

14. A molding press comprising two press members one of which has a movement toward and from the second, and the second of which has a sliding movement into and out of pressing position, an ejecting device for the second member, means for operating the same by the movement of the first away from the second regardless of the sliding movement thereof, and an independent ejecting device for the first member.

15. A hydraulic molding press comprising an inverted platen, means for giving the same right line movement, a tilting head supported on trunnions carried by said platen, means for tilting said head, an ejecting device therefor, and cam means associated with said trunnions for operating the ejecting device by the tilting movement.

16. A molding press comprising a tilting head, an ejecting device therefor, means for tilting said head through about 120°, and means for operating said ejecting device during the first half of the tilting movement and returning it to normal position during the second half thereof.

In testimony whereof, we have hereunto subscribed our names.

FRANCIS E. STEVENSON.
THOMAS F. STACY.